(12) United States Patent
von Gutfeld et al.

(10) Patent No.: US 6,181,408 B1
(45) Date of Patent: Jan. 30, 2001

(54) TOOL AND METHOD FOR INCREASING LIQUID CRYSTAL FILL RATES OF FLAT PANEL IN WHICH A SEALED EDGE IS COMPRESSED

(75) Inventors: Robert Jacob von Gutfeld, New York; Evan George Colgan, Chestnut Ridge; Shui-Chih Alan Lien, Briarcliff Manor, all of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/062,275

(22) Filed: Apr. 15, 1998

(51) Int. Cl.[7] .................. G02F 1/1341; B65B 31/00; B65B 39/00
(52) U.S. Cl. .................. 349/189; 141/5; 141/7; 156/145
(58) Field of Search ................ 349/189; 141/5, 141/7; 156/145

(56) References Cited

U.S. PATENT DOCUMENTS 4,106,860 * 8/1978 Kaufmann ............................ 349/154
5,029,623 7/1991 Brosig .
5,568,297 * 10/1996 Tsubota et al. ........................ 156/145
5,819,824 * 10/1998 Sugiura ................................. 349/189

FOREIGN PATENT DOCUMENTS 4-147217 * 5/1992 (JP) .
6-235896 * 8/1994 (JP) .

* cited by examiner

Primary Examiner—Walter Malinowski
(74) Attorney, Agent, or Firm—McGuireWoods; Louis J. Percello

(57) ABSTRACT

A manufacturing tool and method for enhancing the speed with which display panels can be filled with the requisite liquid crystal is described. In essence, the panel walls are expanded by compression of opposite edges to provide a wider channel for the liquid to flow resulting in a substantial increase in the mass transfer of the liquid crystal per unit time thereby enhancing the panel throughput rate.

12 Claims, 6 Drawing Sheets

TOOL AND METHOD FOR INCREASING LIQUID CRYSTAL FILL RATES OF FLAT PANEL IN WHICH A SEALED EDGE IS COMPRESSED

BACKGROUND OF THE INVENTION

1. Field of the Invention

The present invention generally relates to the field of manufacturing tools and methods for filling liquid crystal panel displays with liquid crystal.

2. Background Description

Liquid crystal panels have become a standard for laptop computers as well as for many other types of devices requiring a display. In general the filling procedure is accomplished in a vacuum chamber by first pumping out the chamber and the panel prior to filling. However, since the spacing between the parallel plates comprising the panel are separated by only several microns, the filling process is extremely slow using present day processing techniques taking on the order of 3–5 hours, thereby limiting the throughput of panels in the manufacturing process. For certain applications such as watches and small computerized toys etc. there is no problem in filling the required space between the front and back faces of the display. However, for laptop computers where the display may have a diagonal screen dimension as large as 12 to 14 inches and an interior front to back spacing of only 5 microns, the filling process is extremely slow and tedious. In fact, the filling time is so prolonged, taking many hours, that this process step is a major cause in limiting the throughput of panel production.

SUMMARY OF THE INVENTION

It is therefore an object of the present invention to provide an improved method and device for filling a liquid crystal display panel without drastically changing the overall panel manufacturing process.

The inventive method of filling includes placing the nearly completed panels, generally stacked in batches within a chamber and pumping the air out of the chamber and hence also from the space between the front and back of the panel faces. In general the top and two side edges of the panel have already been permanently affixed or sealed to one another. Once pump out has been completed the bottom panel edge which is partly unsealed or not yet affixed is brought into contact with a reservoir of liquid crystal. Following these conventional steps, the evacuated chamber is backfilled with nitrogen to produce a positive pressure on the liquid crystal, forcing it into the gap between the front and back panel faces now under vacuum. Simultaneously, the panel is put under mechanical compression to increase the rate at which filling will occur.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
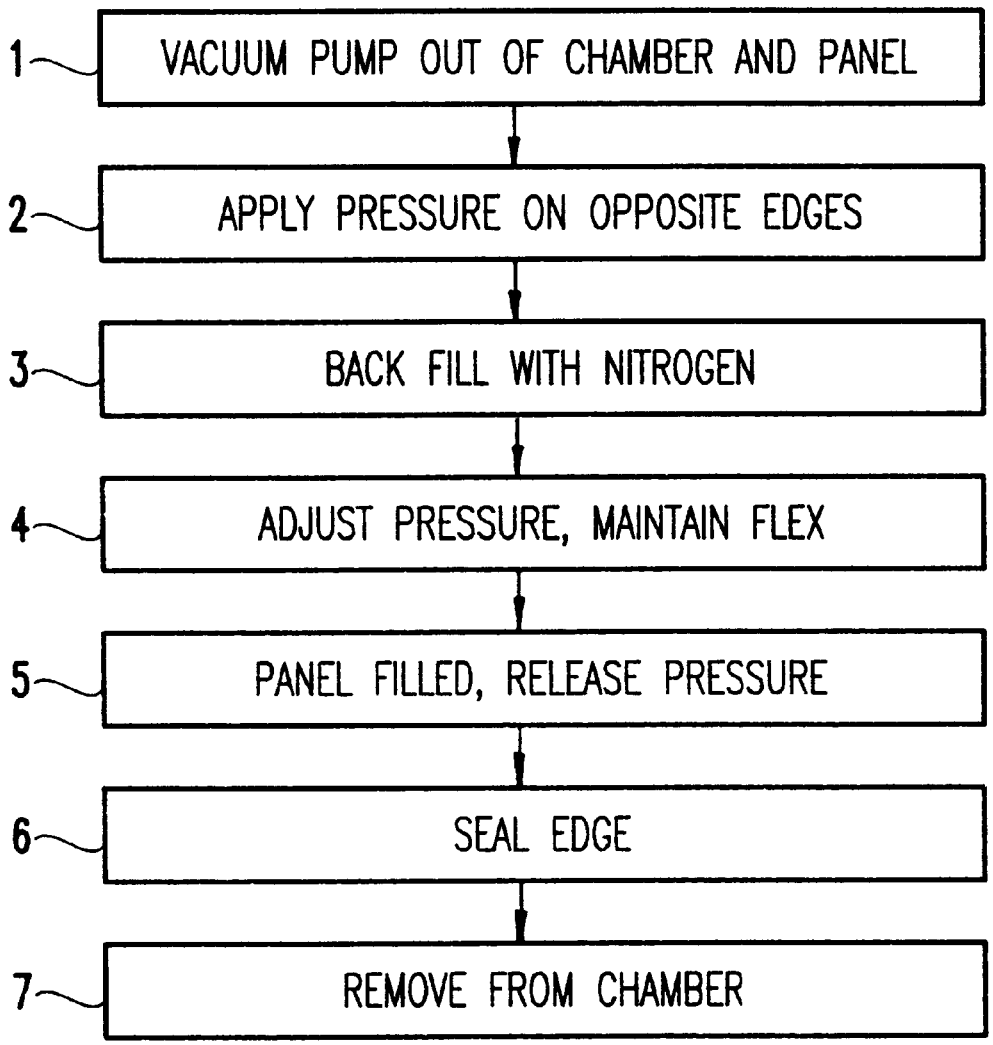
FIG. 1 is a flow diagram showing the steps required for rapid liquid crystal filling of a display panel.

Referring now to the drawings, and more particularly to FIG. 1, there is shown a flow chart of the steps of the present invention. The process begins with either a single prepared panel or group of prepared panels being placed in a vacuum chamber. As can be seen in the step shown in block 1, all air is pumped out in the range of mTorr of the vacuum chamber. The panels are prepared by being mostly assembled by standard methods well known in the art having at least three edges already fully joined while a fourth may be totally open or partly joined. For this invention, panel spacers are placed lithographically so that they are rigidly attached to one or both plates comprising the panels. Pumping out the vacuum chamber creates a vacuum within the chamber and the panel.

Next, as shown in the step in block 2, mechanical pressure is applied to the edges of the panels while under vacuum. Meanwhile the liquid crystal is forced into the panel by way of the positive pressure on the liquid crystal material produced by back filling of the vacuum chamber, as shown in the step in block 3. The pistons may be computer controlled to accurately apply the appropriate amount of compression leading to outward flexing of the panel faces without damage to the panel. Alternatively, only one piston can be used with the opposite edge rigidly constrained by a constraining wall. As shown in the step in block 4, as the backfill pressure is increased, the piston(s) are adjusted to maintain the approximate same degree of flexing.

During liquid crystal filling, mechanically applied pressure at opposite edges may be adjusted to maintain the degree of flex needed to maximize liquid crystal fill. After liquid crystal filling is complete, the applied pressure at the edges is released restoring the panel to its normal spacing dimensions, as shown in the step in block 5. Then, as shown in the step in block 6, the panel(s) edge is sealed. Finally, as shown in block 7, the panel(s) is removed from the chamber and the open or partly open edge is sealed by well known conventional means.

Figure 2:
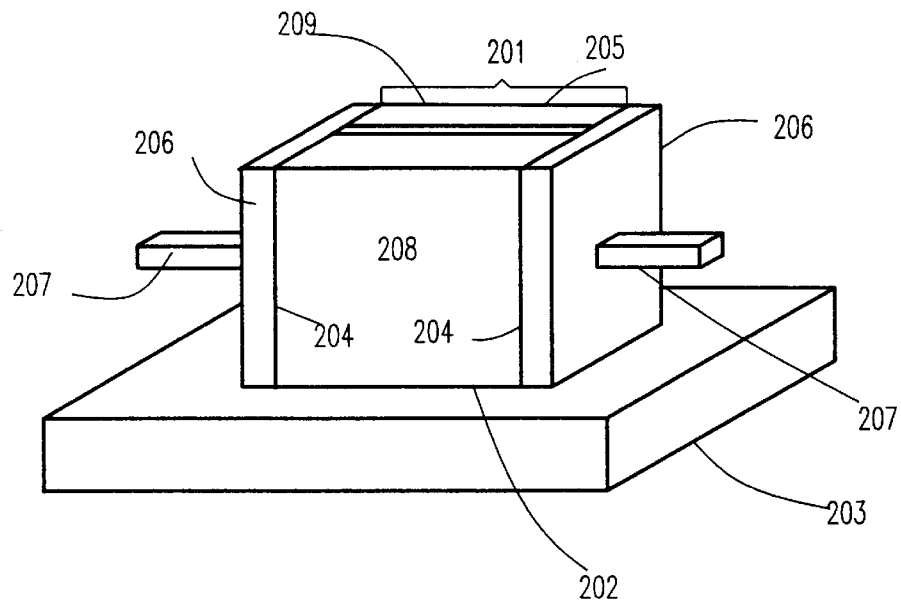
FIG. 2 shows in schematic form the inventive device with one liquid crystal panel to be filled.

FIG. 2 shows a schematic of the inventive device with one mostly assembled panel 201 in place. Once the vacuum has been established, two padded parallel compression slabs 206 mounted on pistons 207 are activated to compress two affixed panel edges 204 simultaneously from opposite panel sides. The mostly assembled panel 201 is shown having a bottom edge 202 submerged in a liquid crystal fill tank 203. The panel 201 is submerged after the chamber (not shown) containing the inventive device is pumped out, creating a vacuum. The mostly assembled panel 201 has two side edges 204 which are cemented and a top edge 205 which may be cemented. The side edges 204 are placed against compression slabs 206. In operation pistons 207 push into compression slabs 206 which press against side edges 204. This will force the front and back parallel plates 208, 209 to bow outward.

Figure 3:
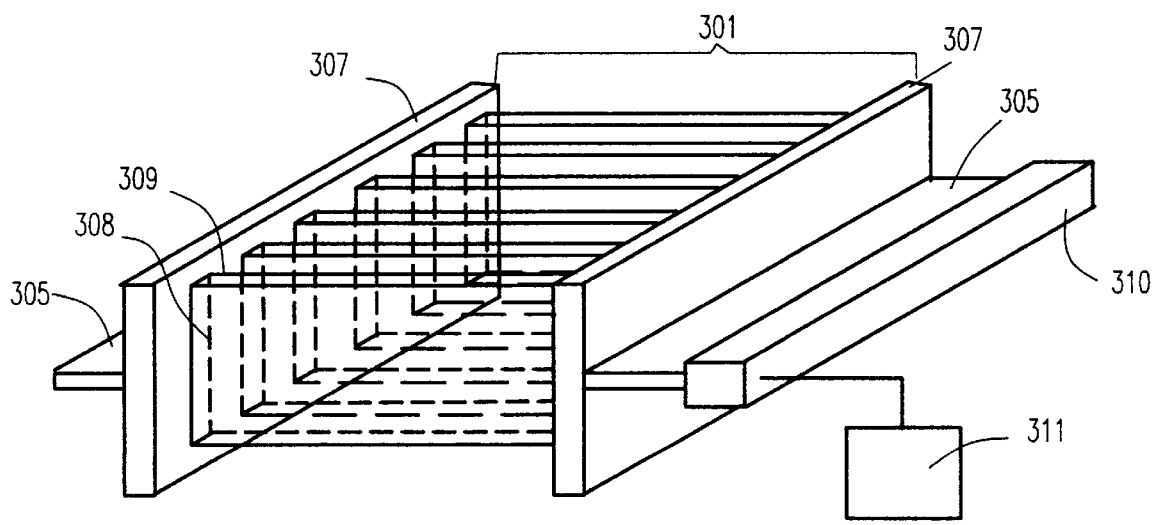
FIG. 3 shows in schematic form the invention with a rack which can process multiple liquid crystal displays simultaneously.

FIG. 3 shows the inventive device having a rack 301 which contains multiples of essentially fully assembled panels. The method of operation in this embodiment is the same. Pistons 305 apply pressure to compress slabs 307 which may or may not be integrated in rack 301. The pressure forces front and back plates 308, 309 of panels to bow outward. Panels are positioned far enough apart on rack 301 such that plates from adjacent panels will not come in contact with one another when bowed outward. A pump 310 controls the pistons 305 with computer control 311.

Figure 4A:
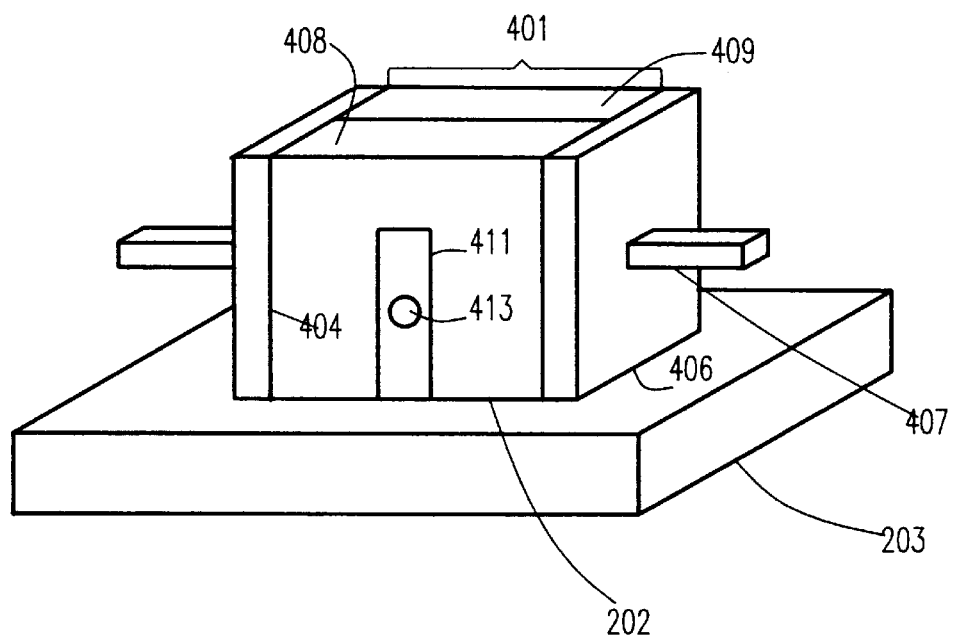
FIGS. 4A and 4B show in schematic form front and side views of an embodiment using thin strips of material attached to the panel sides to assure outward flexing during edge compression.
Figure 4B:
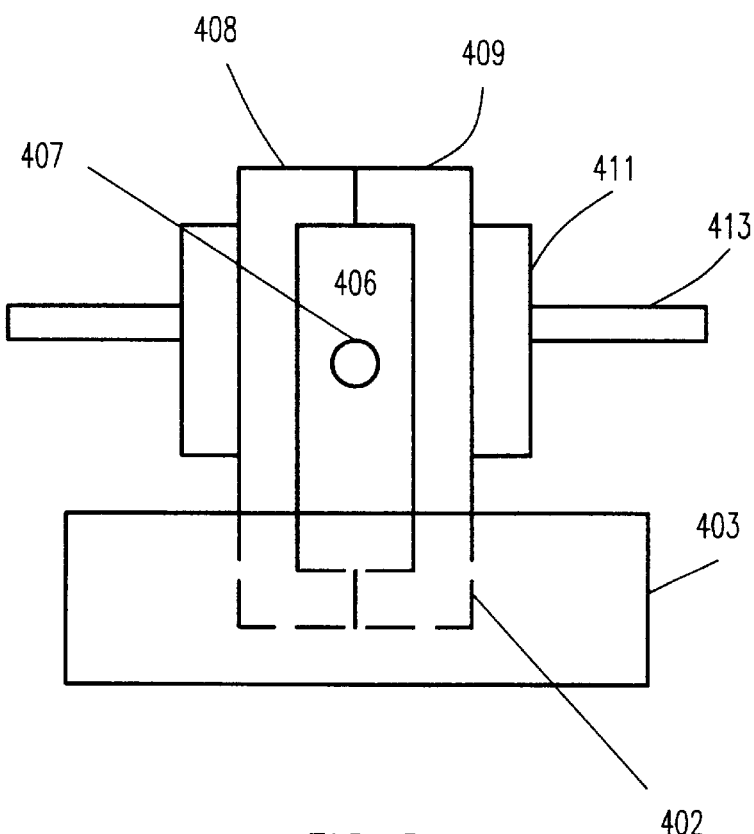

FIGS. 4A and 4B show front and side views of another embodiment. In this embodiment, strips 411 are attached to front 408 and rear 409 plates of the panel 401 with expansion pistons 413 attached to strips 411, in addition to compression pistons 407 at side edges 404 via slabs 406. Strips 411 can be affixed in place with a readily soluble adhesive. As the compression pistons 407 compress the edges, a separate set of expansion pistons 413 pulls on the attached strips 411 to assure outward flexing during edge compression. After the panel is filled with the liquid crystal material the computer controlled expansion pistons relax as do the edgewise compression pistons. Both sets of pistons are coordinated to assure compatibility of the compression of one set and the expansion of the other. After the panel is completed and removed from the vacuum chamber, these strips are removed by a common solvent.

Figure 5:
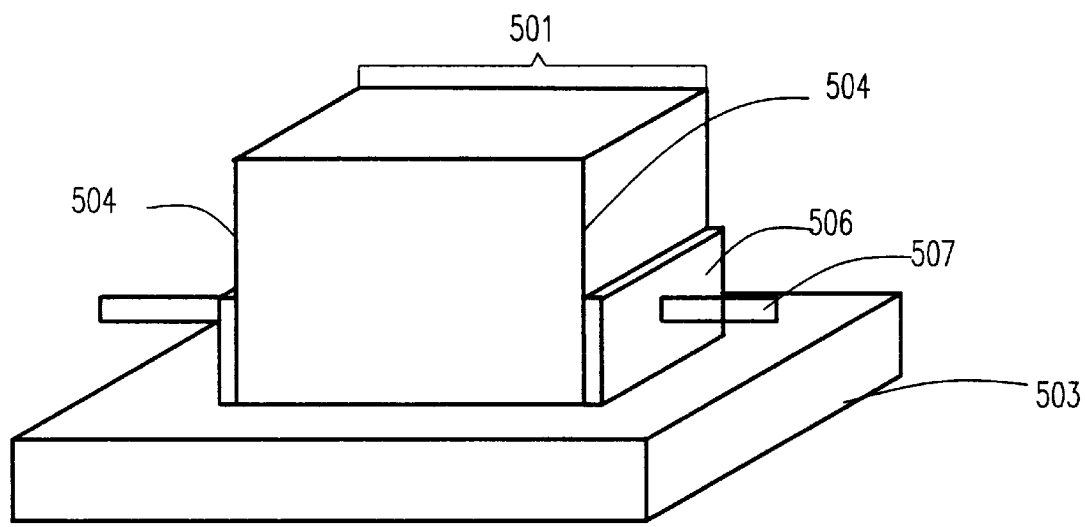
FIG. 5 is a side schematic view of a preferred embodiment of the invention which reduces pressure on the top sealed edge of a panel.
Figure 6:
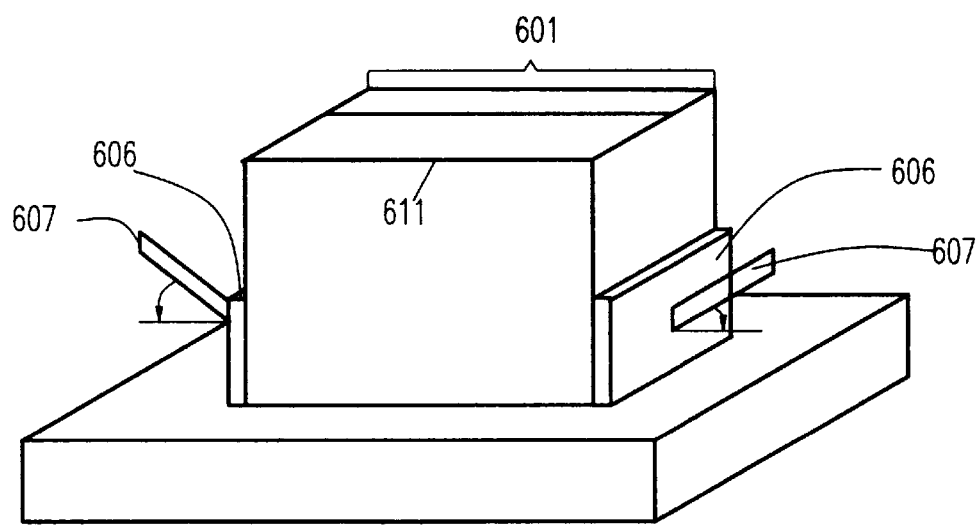
FIG. 6 is a side schematic view of a preferred embodiment of the invention which reduces pressure on the top sealed edge of a panel by directing a compression force at an angle away from the top or totally sealed edge.

Another preferred embodiment is illustrated in FIGS. 5 and 6. These figures show schematic drawings of the inventive apparatus constructed in a manner to reduce pressure on the sealed top edge of a panel during compression. In FIG. 5, there is shown a mostly assembled panel 501 in the inventive apparatus. The apparatus has compression plates 506 which apply pressure directed towards the bottom half of sealed sides 504 of the panel 501. While pistons 507 maintain compression on sides 504 the unsealed or partially sealed bottom of the panel is immersed in a liquid crystal reservoir 503. Once again, pressure from back filling causes the panel to be filled with the liquid crystal material.

FIG. 6 shows an apparatus similar to that shown in FIG. 5 except that compression pistons 607 apply pressure to compression plates 606 at an angle 605 which directs the force of the compression away from sealed panel top edge 611.

Figure 7:
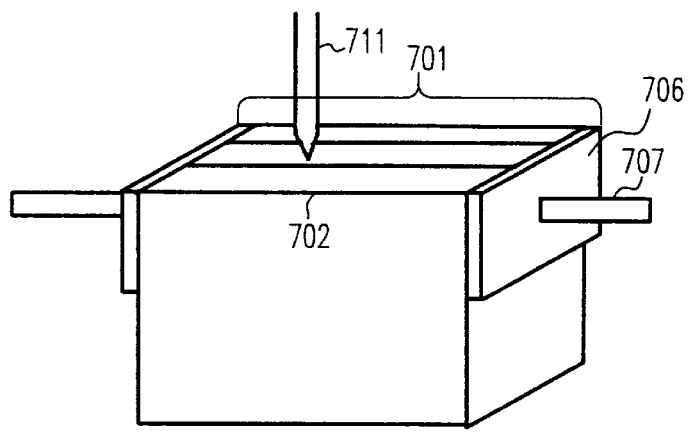
FIG. 7 is a side schematic view of another embodiment of the invention.

In another embodiment, the panel is filled by pouring or pipetting liquid crystal in the bottom unsealed edge of the panel. FIG. 7 shows a side view of a mostly completed panel 701 with the unsealed bottom edge 702 pointing up to receive liquid crystal poured into the panel 701 via an automated pipette 711. As pistons 707 and compression plates 706 hold panel open, the pipette 711 is moved across the opening of the bottom upward directed unsealed edge 702. Although this figure shows one pipette filling one panel, an array of pipettes can be used, filling multiple panels in the same apparatus. The chamber in which the apparatus is placed continues to be back filled with nitrogen or another inert gas to assist in filling the liquid crystal display panel by way of a differential pressure or pressure gradient.

Figure 8:
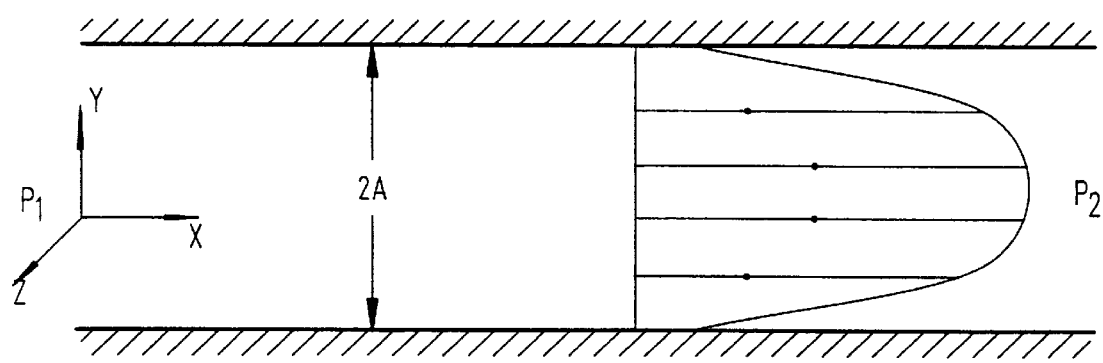
FIG. 8 is a diagram illustrating the relationship between the channel flow rate and the channel width.
Figure 9:
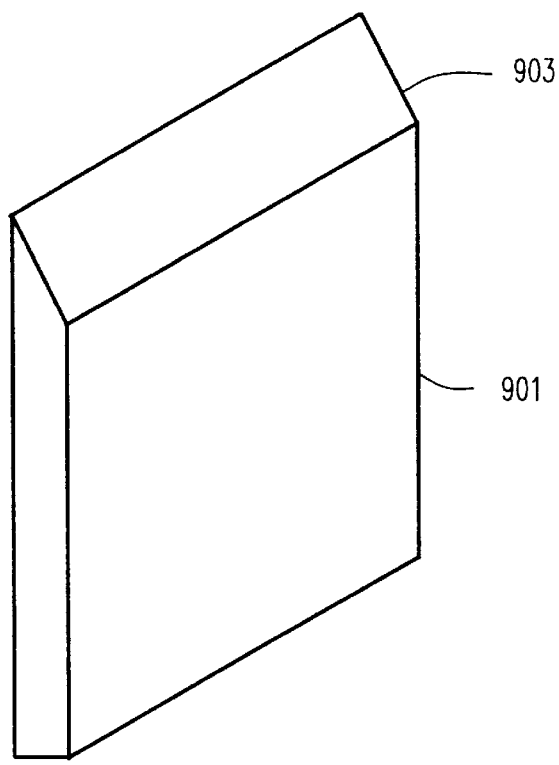
FIG. 9 is a schematic diagram of single glass plate having a beveled edge.
Figure 10:
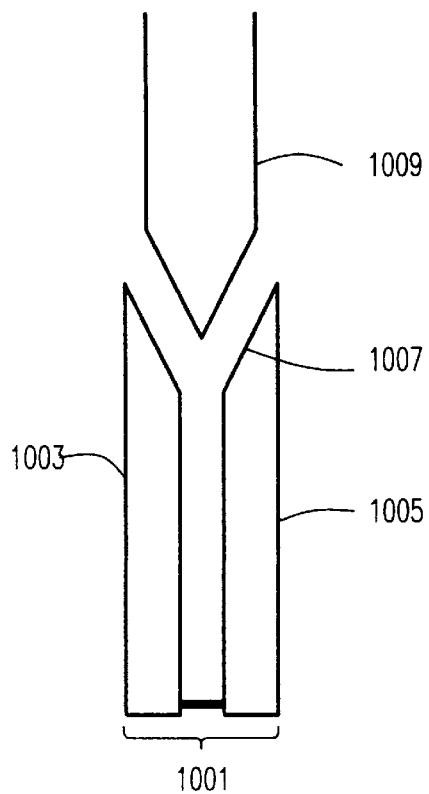
FIG. 10 is cross sectional view of panel having beveled edges being filled with a pipette.

The glass plates may be contoured or beveled to assist pouring or filling of liquid crystal material as shown in FIGS. 8, 9 and 10. When panels with the unsealed bottom edge point upward to be filled with a pipette or similar device, compression of sealed sides will aid filling of the panel. However, compression is not necessary. The liquid crystal material can simply be poured into the panel. Shaping of the plate edges which meet at the unsealed edge of the panel will provide a trough for liquid crystal material and will assist in filling panels. FIG. 8 shows a single glass plate 801 with a beveled edge 803 which can be used for this purpose. FIG. 9 shows a panel 901 having plates 903, 905 with beveled edges 907 being filled with a pipette 909, here shown without the use of compression. FIG. 10 shows a panel 1001 having plates 1003, 1005 with step edges 1007 being filled with a pipette 1009. Shapes other than a bevel or a step may also serve the same purpose.

Figure 11:
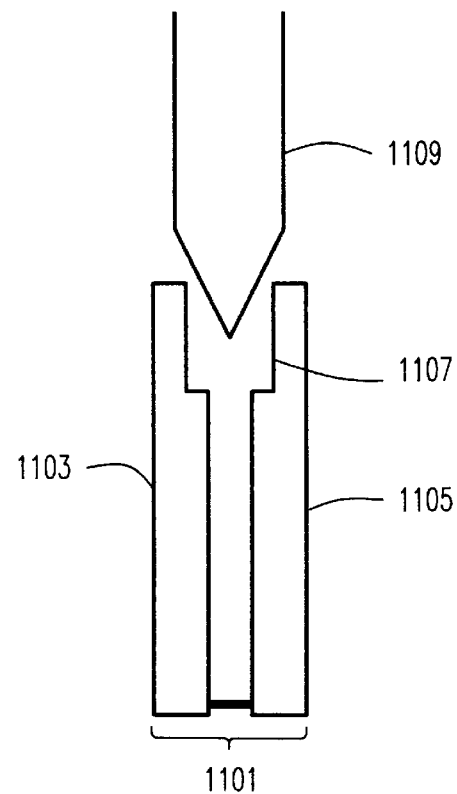
FIG. 11 is cross sectional view of panel having step edges being filled with a pipette.

The inventive method can reduce the time required for filling the panel based on fluid dynamic principles. It is well known that a boundary layer occurs along the entire wetted area of plates (or surfaces) when fluid flows between two constrained plates also known as channel flow (See for example *Physical Fluid Dynamics* by D. J. Tritton, Van Nostrand Reinhold Company (1977). At each of the two boundaries defined by the two inner surfaces of the panel plates, the fluid has essentially zero velocity (in the fill flow direction) with a parabolic mass transport velocity profile across the panel spacing, here the y-direction. The maximum fluid velocity, v, occurs along the plane parallel to the two glass panels at the mid-spacing of the y-dimension. In the ideal case of channel flow between two plates, where the fluid extends over the entire width of the channel under an applied pressure (here the pressure caused by the back fill pressure $p_1$ with respect to the vacuum in the panel $p_2$) the fluid velocity profile of the viscous liquid (the liquid crystal) can be represented by the parabolic contour shown in FIG. 11. The wider the spacing between plates, y, the faster, on average the fluid can flow under a given pressure differential, $p_1-p_2$. For example, assume a spacing equal to 2a as shown in FIG. 11. It can be shown (see above cited reference for example) that the mass of fluid flow per unit time per unit channel width (where the z direction corresponds to the panel width; y, the panel spacing; x, the direction of fluid flow) is proportional to $a^3$ (the half y spacing cubed). We assume as an example using our invention that the glass be extended or outwardly flexed by 4 microns maximum on each panel face from its equilibrium position by the flexing tool; then the following holds:

Initially y=a=2 microns; outward flexing of 4 microns on each panel so that y=a'=6 microns at the maximum position of flexing. The increase in flow is given by the ratio 6/2 (a'/a) cubed=27. However, more realistically, since not all of the panel will flex to that extent one can, to first order, assume an average flex of only 2 microns;. The ratio reduces to 4/2 cubed or a factor of 8. As the glass plates become thinner they become increasingly flexible. Thus, there is reason to assume that flexing can greatly exceed 4 microns at the center leading to an even greater fill rate (mass flow).

In summary, the inventive device and method uses compression to temporarily increase the spacing between two plates constituting the display panel during filling. This results in a much more rapid liquid crystal fill of the panel than is presently possible; hence to a much larger manufactured panel throughput. The increased fill speed occurs due to the proportionately narrower stationary fluid boundary layer region and overall increase in mass transport for a given pressure differential ($p_1$–$p_2$) as shown in FIG. 11 that results from increasing the spacing between the panel faces.

Alternatively, the piston driven slabs (arms) can have a slow oscillatory motion (1–10 Hertz) to provide a more uniform overall outward flexing on average of the panel faces.

While the invention has been described in terms of preferred embodiments, those skilled in the art will recognize that the invention can be practiced with modification within the spirit and scope of the appended claims.

We claim:

1. An apparatus for filling a channel within a panel with liquid crystal, said channel initially under vacuum, comprising:
    a means for widening said channel by compressing said panel;
    a computer controlled means for regulating compression to permit a predetermined amount of outward flexing of the compressed sides to take place; and
    a means for bringing said channel in contact with said liquid crystal.

2. An apparatus as in claim 1 wherein said means bringing said channel in contact with said liquid crystal includes an apparatus to pour liquid crystal into said channel.

3. An apparatus as in claim 2 wherein said apparatus to pour is a pipette.

4. An apparatus as in claim 1 wherein said means of bringing said channel in contact with said liquid crystal includes dipping said channel in a reservoir.

5. An apparatus as in claim 1, further comprising backfilling said channel with an inert gas to exert pressure on the liquid crystal.

6. An apparatus as in claim 1 wherein said panel is a liquid crystal display panel.

7. An apparatus as in claim 1 wherein said means for widening by compressing is a piston driven slab.

8. An apparatus as in claim 7, wherein said piston driven slab applies a pressure to a lower portion of an upper sealed edge of said panel.

9. An apparatus as in claim 8, wherein said pressure angles towards an unsealed bottom edge of said panel.

10. An apparatus as in claim 1, wherein said means for widening by compressing includes a means for pulling on a multiplicity of sides of said panel.

11. An apparatus as in claim 10, wherein said means for pulling comprises:
    a multiplicity of strips attached to said multiplicity of said sides of said panel; and
    a multiplicity of expansion pistons for engaging said strips.

12. A method of filling a channel in a panel with liquid crystal comprising the steps of:
    placing said panel in a chamber;
    vacuum pumping said chamber;
    compressing at least one sealed edge of said panel;
    bringing an unsealed edge of said panel in contact with a liquid crystal; and
    backfilling said chamber with an inert gas to produce pressure forcing the liquid crystal into the panel.

* * * * *